United States Patent [19]

Fleck

[11] Patent Number: 5,287,932
[45] Date of Patent: Feb. 22, 1994

[54] SOIL TILLING DEVICE

[75] Inventor: Alfons Fleck, Bermatingen, Fed. Rep. of Germany

[73] Assignee: Maschinenfabrik Bermatingen GmbH & Co., Bermatingen, Fed. Rep. of Germany

[21] Appl. No.: 800,407

[22] Filed: Nov. 29, 1991

[30] Foreign Application Priority Data

Nov. 29, 1990 [DE] Fed. Rep. of Germany ....... 4038008
Nov. 5, 1991 [DE] Fed. Rep. of Germany ....... 4136328

[51] Int. Cl.$^5$ ..................... A01B 35/16; A01B 33/00
[52] U.S. Cl. ........................ 172/96; 172/91; 172/111
[58] Field of Search ............ 172/94, 91, 92, 96, 172/110, 111

[56] References Cited

U.S. PATENT DOCUMENTS

| 398,648 | 2/1889 | Paterson | 172/91 |
|---|---|---|---|
| 2,429,298 | 10/1947 | Savage | 172/91 |
| 2,619,017 | 11/1952 | Stephenson | 172/96 |
| 3,199,607 | 8/1965 | Granius | 172/111 |
| 3,321,026 | 5/1967 | Hubbard | 172/111 |
| 3,530,946 | 9/1970 | Major | 172/96 |
| 4,044,839 | 8/1977 | van der Lely | 172/91 |
| 4,051,903 | 10/1977 | van der Lely | 172/91 |
| 4,250,969 | 2/1981 | Orlanda | 172/110 |
| 4,936,390 | 6/1990 | Anderson et al. | 172/91 |

FOREIGN PATENT DOCUMENTS

| 3324464 | 1/1985 | Fed. Rep. of Germany | 172/111 |
|---|---|---|---|
| 3507475 | 3/1985 | Fed. Rep. of Germany | |
| 41497 | 11/1912 | Sweden | 172/92 |
| 327994 | 2/1958 | Sweden | 172/111 |
| 2037131 | 7/1980 | United Kingdom | 172/96 |

Primary Examiner—Dennis L. Taylor
Assistant Examiner—Spencer Warnick
Attorney, Agent, or Firm—Robert W. Becker & Associates

[57] ABSTRACT

A soil tilling device that is pulled by a tractor vehicle comprises at least one tool holder that is supported at a supporting element and is rotatably drivable. At least two circular disk-shaped soil tilling tools are connected to a respective one of the tool holders and are distributed over a circumference of the tool holder at a uniform distance from one another. Each one of the soil tilling tools is connected to a shaft whereby the shaft is supported at a support that is connected to the tool holder. The soil tilling tools are rotatable about an axis of rotation thereof corresponding to the shaft. This shaft is slanted relative to an axis of rotation of the tool holder such that the soil tilling tools have an angle of 20° to 40° to a surface of soil to be tilled whereby circumferential sections of the soil tilling tools form tilling surfaces. With this embodiment it is possible to achieve a clean soil tilling without soil parts or rocks being pulled from the soil and thrown into the air. With the soil tilling tools, which are rotating about the axis of rotation of the tool holder, but are freely rotatable about their shafts, an intensive and uniform soil tilling at a uniform tilling depth is ensured. The soil surface is cut and smoothed by the soil tilling tools which roll on the soil surface opposite to the direction of rotation of the tool holder without damaging roots of cultivated plants.

12 Claims, 14 Drawing Sheets

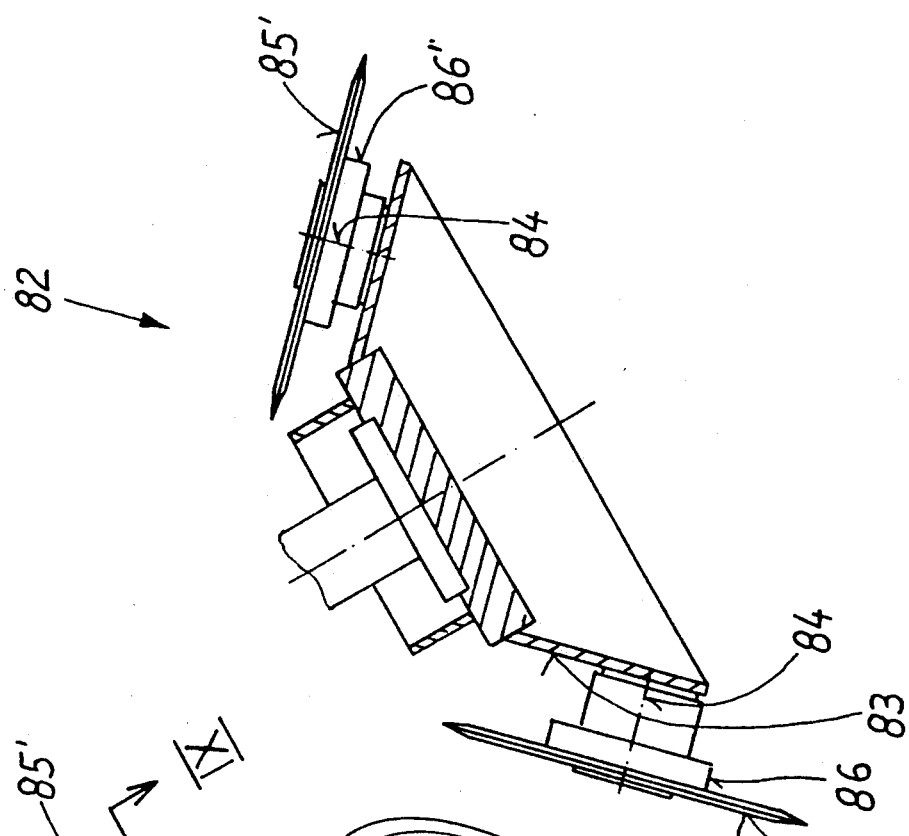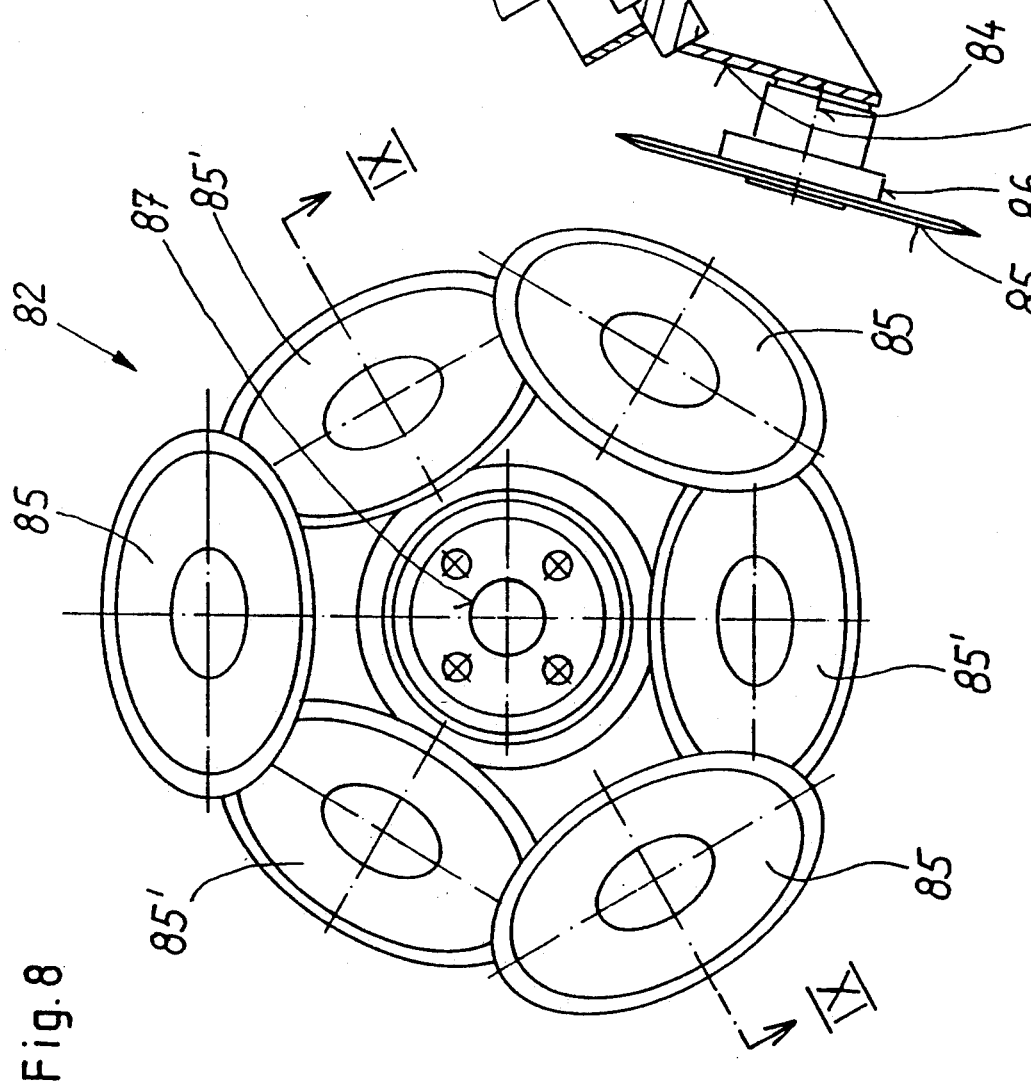

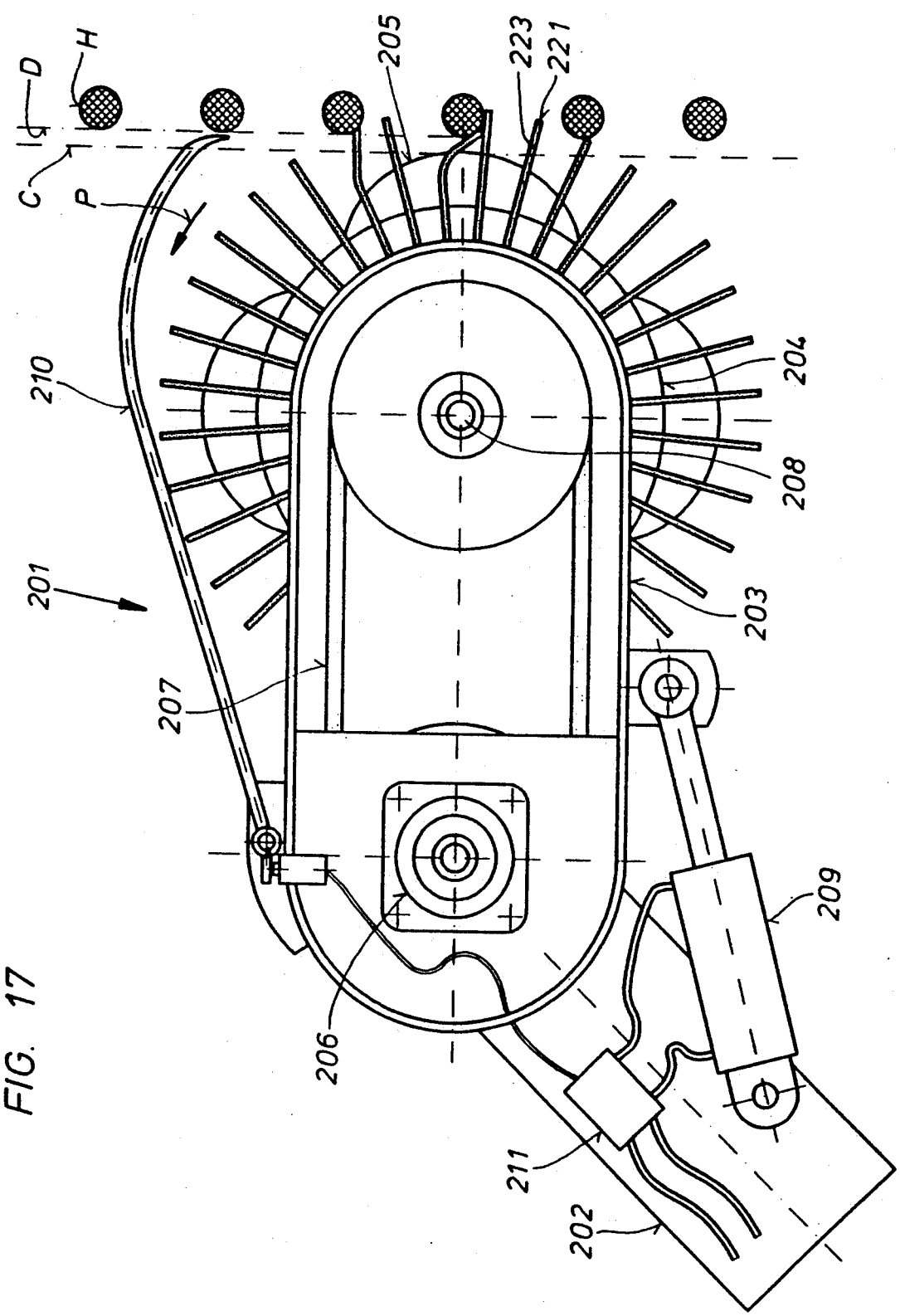

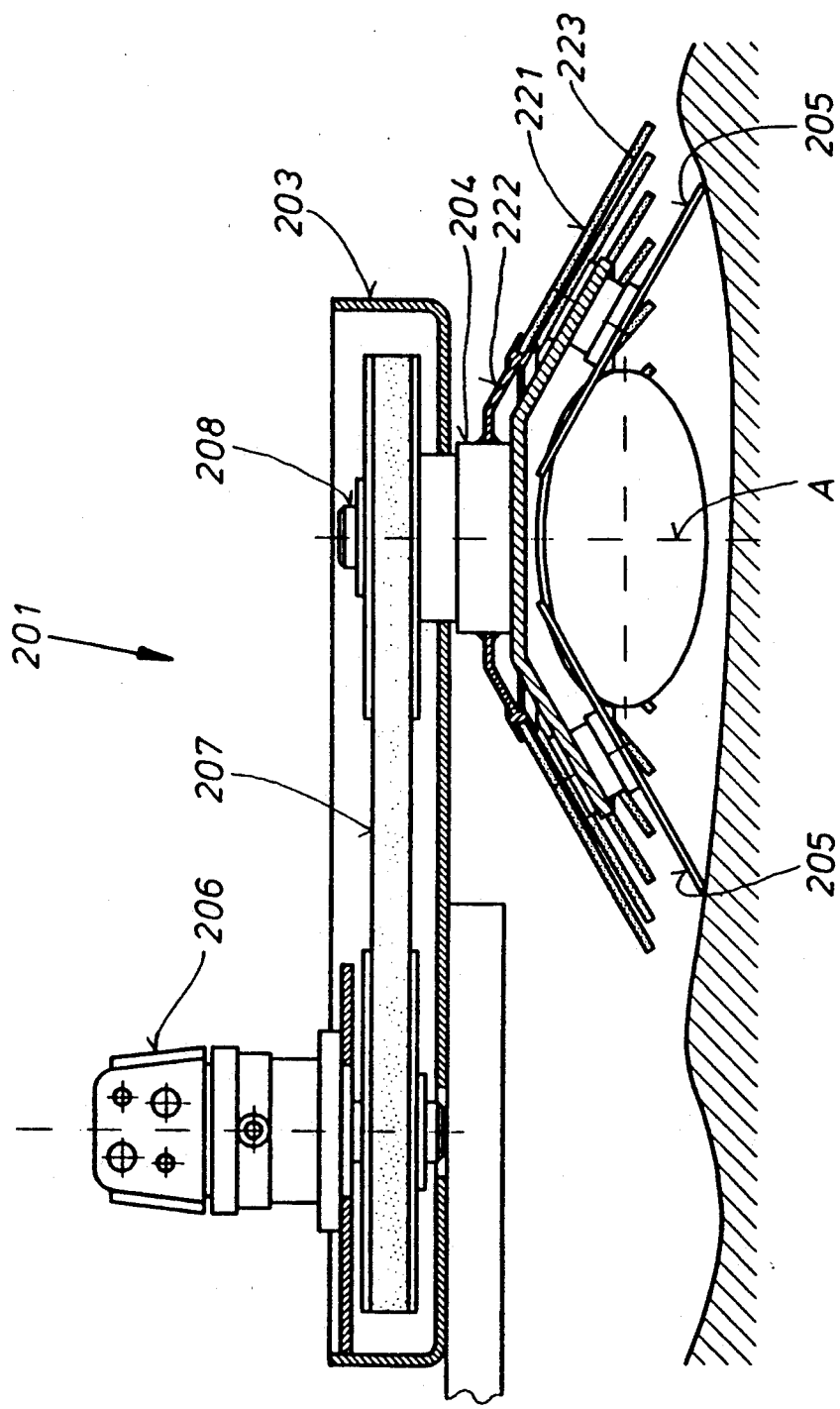

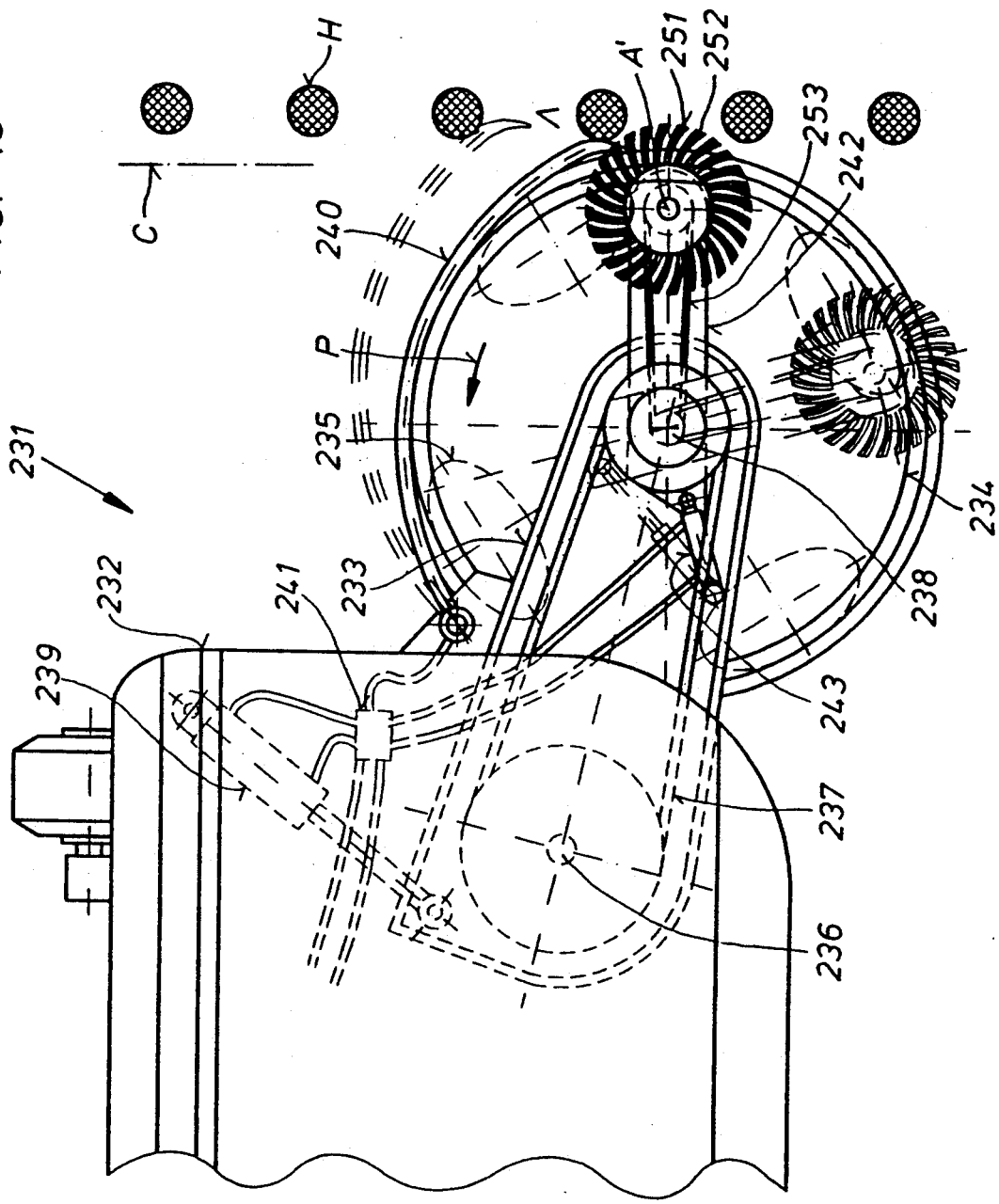

SOIL TILLING DEVICE

BACKGROUND OF THE INVENTION

The present invention relates to a soil tilling device with at least one tool holder that is connected to a support frame or a swivel arm whereby the tool holders are rotatably drivable and are provided with soil tilling tools.

Soil tilling devices of the aforementioned kind are known in various embodiments. The tool holder is usually provided with a soil tilling tool in the form of a disk that is provided with a vertically extending prong whereby the disk is fixedly connected to the tool holder. The tool holder is generally drivable by a pulling vehicle or tractor to which the soil tilling device is connected.

With forcedly driven tools of the aforementioned kind an intensive soil tilling is possible; however, the prongs often tear up the soil to an undesirably great extent and furthermore, a tilling of a uniform depth is not possible. Another disadvantage is that when using such soil tilling devices with the aforementioned tools the rotatingly driven prongs throw rocks and pieces of soil in the air. Also, the roots of cultivated plants between which the soil is tilled are often damaged. Furthermore, driving such a tool holder requires a great drive power. When working with the aforementioned soil tilling devices the danger of having accidents is therefore quite great, and extensive constructive measures must be taken, especially to prevent rocks and soil parts from being thrown in the air, and to prevent accidents due to the prongs rotating at a high speed. Furthermore, it is disadvantageous that the forcedly driven prongs are often damaged when hitting a rock or any other obstacle so that the operation of the tilling device must be interrupted in order to repair respective damages. Furthermore the aforementioned tilling devices are usually very tall and tilling soil under trees with low branches is often impossible. Also, when the soil to be tilled is grown over with weeds a clogging of the machine due to weeds pulled from the soil is inevitable. A satisfactory operation, especially under changing working conditions to which such tilling devices are usually exposed, is thus impossible.

It is therefore an object of the present invention to provide a soil tilling device for multiple applications which allows a high working speed without pulling rocks and soil parts from the soil to be tilled and throwing them into the air, and without the necessity of providing special measures to prevent accidents. Furthermore, a satisfactory and uniform tilling of soil of various soil conditions should be possible. The soil should not be torn up and removed, and roots of cultivated plants between which the soil is to be tilled should not be damaged, and it is desired that the soil surface in one working step is cut and also smoothed so that weeds are reliably removed. Furthermore, it should be possible to feed grass which is directly adjacent to trees or other obstacles into the soil tilling device so that grass may be mowed. Also, shoots that are growing at lower portions of a tree should be removable with the soil tilling device.

The required constructive expenditures should be low, and an economic manufacture should be provided. The drive power required for driving the soil tilling device should be low. It should be impossible that during the tilling process in tall grass a clogging within the area of the tool holder occurs. The soil tilling device should be universally applicable and a high operational safety with a long life span of the tools should be ensured. Furthermore, the tilling depth should be adjustable and uniform.

SUMMARY OF THE INVENTION

The soil tilling machine according to the present invention is primarily characterized by at least one tool holder that is supported at a supporting element and is rotatably drivable; at least two circular disk-shaped tools connected to a respective one of the tool holders and uniformly distributed over a circumference of the tool holder, with each one of the soil tilling tools being connected to a shaft, whereby the shaft is supported at a support of the tool holder, the soil tilling tools being rotatable about an axis of rotation thereof that corresponds to the shaft; and the shaft is slanted relative to an axis of rotation of the tool holder such that the soil tilling tools have an angle of 20° to 40° to a surface of the soil to be tilled, with circumferential sections of the soil tilling tools forming tilling surfaces. The supporting element may be in the form of a support frame or a swivel arm.

It is preferable that the tool holder has an axis of rotation that is tilted in the direction of travel or against the direction of travel of the soil tilling device. The tilting of the tool holder, in a simple manner, may be achieved by providing a support frame that is pivotable about a pivoting axis which is essentially horizontal and extends perpendicularly to a direction of travel of the soil tilling device, whereby the pivoting axis is in the form of a bolt that is provided at guiding elements of a frame of the tractor vehicle, the guiding elements being connected to the support frame. For pivoting the support frame, a servo device may be provided at the guiding elements.

The soil tilling tools of a soil tilling device may be connected to a common support which is fastened to the tool holder and may be provided in the form of a truncated pyramid or a truncated cone. However, it is also possible to connect each of the soil tilling tools to a respective support, whereby the support is connected to the tool holder and is adjustable about a horizontal pivotable axis in the form of a bolt. The support may be adjustable against the force of a spring, and the respective end positions of the support are determined by respective abutments. Furthermore, it is expedient that the supports are adjustable at different angles of tilt relative to one another.

In a preferred embodiment the support is provided with respective carrier elements to which the soil tilling tools are connected, whereby the carrier elements are pivotably connected to the support so that the soil tilling tools are laterally pivotable relative to the support. The carrier elements may be angled. It is furthermore expedient that the soil tilling tools are connected to the carrier elements by a respective shaft, whereby vertically above the carrier element the shaft may be provided with a supporting means, for example, in the form of a wheel that is rotatably supported at the shaft.

In another embodiment the soil tilling tools have varying diameters. Furthermore, it is preferable that the soil tilling tools that are connected to the tool holder are arranged at different levels of the soil tilling device. The soil tilling tools may be arranged above and below the support at a same distance or at varying distances. It is also possible that the soil tilling tools are arranged below the support at a same or varying distances, or that the soil tilling tools are arranged above the support at a same or varying distances.

In a preferred embodiment six of the soil tilling tools are provided at the tool holder whereby diametrically oppositely arranged ones of the soil tilling tools are provided at different levels of the soil tilling device.

It is expedient to provide the underside of the tool holder with an abutment for adjusting an engagement depth of the soil tilling tools with the soil to be tilled.

When the support frame is provided with a plurality of tool holders, the tool holders, in a direction of travel, should be staggered such that a respective tilling range of the soil tilling tools of the respective tool holders overlap one another. The abutment is preferably in the form of a gliding disk that is height-adjustable.

The disk-shaped soil tilling tools may be in the form of a toothed disk, a disk-shaped knife, a disk provided with spring prongs, or a disk provided with brushes.

In another embodiment of the soil tilling device grass that is positioned between obstacles or is located close to obstacles may be fed into the soil tilling tools in order to be mowed; for this purpose, the soil tilling tools are provided with a cleaning tool that is arranged vertically above the soil tilling tools and may be provided in the form of a wheel brush that is rotatably driven about a vertically extending axis, with brush elements of the wheel brush extending with at least one portion thereof beyond a tilling range of the soil tilling tools. Instead of a wheel brush, a brush roller may be provided as a cleaning tool, which is rotatably driven about a horizontally extending axis. The brush elements of the brush roller preferably extend with at least one portion thereof beyond a tilling range of the tools.

It is preferable that the wheel brush and the tool holder are drivable in a same direction of rotation. Furthermore, it is expedient that the wheel brush is arranged concentrically to the tool holder and is directly connected thereto. It is also possible that the wheel brush is arranged at a supporting device coordinated with the tool holder. The supporting device may be in the form of a pivoting arm. It is furthermore expedient that the wheel brush is arranged at a lever that is supported at the pivoting arm, whereby the lever as pivotable in a controlled manner by a servo device. The lever may be pivotable about an axis in the form of a shaft of the tool holder. It is also possible that the wheel brush is arranged at a slide that is supported at the pivoting arm whereby the slide is adjustable in a controlled manner by a servo device. The slide is preferably radially outwardly adjustable.

The tool holder may be supported at the pivotable arm and may be provided with a sensor, whereby the wheel brush is arranged such that brush elements thereof extend outwardly beyond a working range of the sensor. The sensor may be connected to a control device for actuating the servo device such that when a displacement of the sensor occurs the wheel brush assumes an operating position.

It is expedient that the wheel brush is fixedly connected to the tool holder. The brush elements of the wheel brush may be arranged parallel to the soil tilling tools.

In another embodiment it is possible that the wheel brush is arranged eccentrically relative to the tool holder at an outer portion thereof in a rotatable manner and is drivingly connected to the tool holder.

For the driving connection between the wheel brush and the tool holder a chain drive or a belt drive may be provided.

In a preferred embodiment the wheel brush is a disk to which at least one radially extending rod or strip is connected to form the brush elements, whereby the rod or strip is elastically deformable in a circumferential direction of the disk and is made of a whether-resistant plastic material. It is expedient that the rod or strip is bent in the circumferential direction.

When a brush roller is provided it is expedient that the brush roller is connected to a shaft that is tilted in an outward direction relative to a direction of travel of the tilling machine. The shaft of the brush roller may be driven by a hydraulically actuatable rotation motor.

It is furthermore possible that the brush roller is directly connected to the tool holder or is arranged at a supporting device connected to the tool holder. The supporting device may be in the form of a pivotable arm.

In a preferred embodiment the brush roller is arranged at a lever that is supported at the pivoting arm, whereby the lever is pivotable in a controlled manner by a servo device. The lever may be pivotable about an axis in the form of a shaft of the tool holder. Furthermore, it is possible that the brush roller is arranged at a slide that is supported at the pivoting arm, whereby the slide is adjustable in a controlled manner by a servo device and is radially outwardly adjustable.

It is preferable that the tool holder is supported at the pivoting arm and is provided with a sensor, whereby the brush roller is arranged such that brush elements thereof extend outwardly beyond a working range of the sensor. The sensor is connected to a control device for actuating the servo device such that when a displacement of the sensor occurs the brush roller assumes an operating position.

It is expedient that the brush roller is formed by a plurality of rubber flaps that are connected with one end thereof to a drivable shaft.

With a soil tilling machine according to the present invention in which disk-shaped at least two soil tilling tools are provided at a driven tool holder and are arranged on a shaft tilted relative to the soil to be tilled, a clean and efficient soil tilling is possible without tearing or pulling out soil parts and rocks and throwing them into the air. The soil tilling tools are rotating about the axis of rotation of the tool holder and are also freely rotatable about their own shafts so that an intensive and uniform tilling of the soil at a constant tilling depth is ensured. The soil tilling tools rotate against the direction of rotation of the tool holder along the soil so that soil parts and rocks are not carried away with the soil tilling tools. The soil surface is thus cut open by the soil tilling tools in their respective working range so that weeds to be removed are cut below the soil surface in a reliable manner without roots of cultivated plants being damaged. Within the rear portion of the tilling machine the soil is smoothed by the soil tilling tools.

Since the disk-shaped soil tilling tools are not forcedly driven their wear is very low. Due to the rolling movement on the soil surface different sections of the tools are engaged by the soil so that the wear is thus evenly distributed over the circumference of the tool, respectively, the tool is actually automatically sharpened. Furthermore, damages to the tools are almost entirely prevented since the tools are rolling along rocks or similar obstacles so that an uninterrupted operation over an extended period of time may be ensured.

Furthermore it is advantageous that due to the tilt of the tool holder in the direction of travel the tools exert a pulling force so that thereby they will dig into the soil to thereby further improve the soil tilling. Since the soil tilling tools themselves are not driven rocks and soil parts may not be torn from the soil and thrown into the air so that no particular measures must be taken to prevent accidents caused by flying rocks or soil parts. It is especially advantageous that the drive power of the tool holder is substantially reduced, although, high tilling speeds, even under differing soil conditions, are still possible. Furthermore, root sections, weeds and grass are not carried along by the soil tilling tools so that clogging within the tool holder is prevented. The inventive soil tilling device thus provides, despite a minimal constructive expenditure and a low drive power, a simple handling and a sufficient soil tilling, especially within orchards and vegetable cultivations as well as in berry plantations.

When in the inventive embodiment a cleaning tool in the form of a wheel brush or a brush roller is provided it is furthermore possible within a single working process to perform the soil tilling and, at the same time, to feed grass, which is located between tree trunks or other obstacles or is positioned close to obstacles, to the soil tilling device and to thereby mow the grass. Furthermore shoots that are growing within the lower sections of a tree may be removed with the aid of the cleaning tools. Thus any manual follow-up labor is entirely eliminated. Since the cleaning tool may be installed and used only when needed it is not subjected to a high wear.

BRIEF DESCRIPTION OF THE DRAWINGS

This object, and other objects and advantages of the present invention, will appear more clearly from the following specification in conjunction with the accompanying drawings, in FIG. 1 shows a tractor with a connected soil tilling device in a plan view;

FIG. 8 shows a tool holder with soil tilling tools at various rotational levels of the tilling device;

FIG. 9 shows a cross-sectional view along the line IX—IX of FIG. 8;

FIG. 17 shows, in a plan view, a tool holder that is connected to a pivoting arm and is provided with soil tilling tools, further having a wheel brush as a cleaning tool;

FIG. 18 shows a soil tilling device according to FIG. 17 in an axial cross-sectional view; and FIG. 19-20 show the soil tilling device according to FIG. 17 with a pivotably arranged wheel brush, respectively, a radially adjustable brush roller as cleaning tools.

DESCRIPTION OF PREFERRED EMBODIMENTS

The present invention will now be described in detail with the aid of several specific embodiments utilizing FIGS. 1 through 20.

Figure 1:
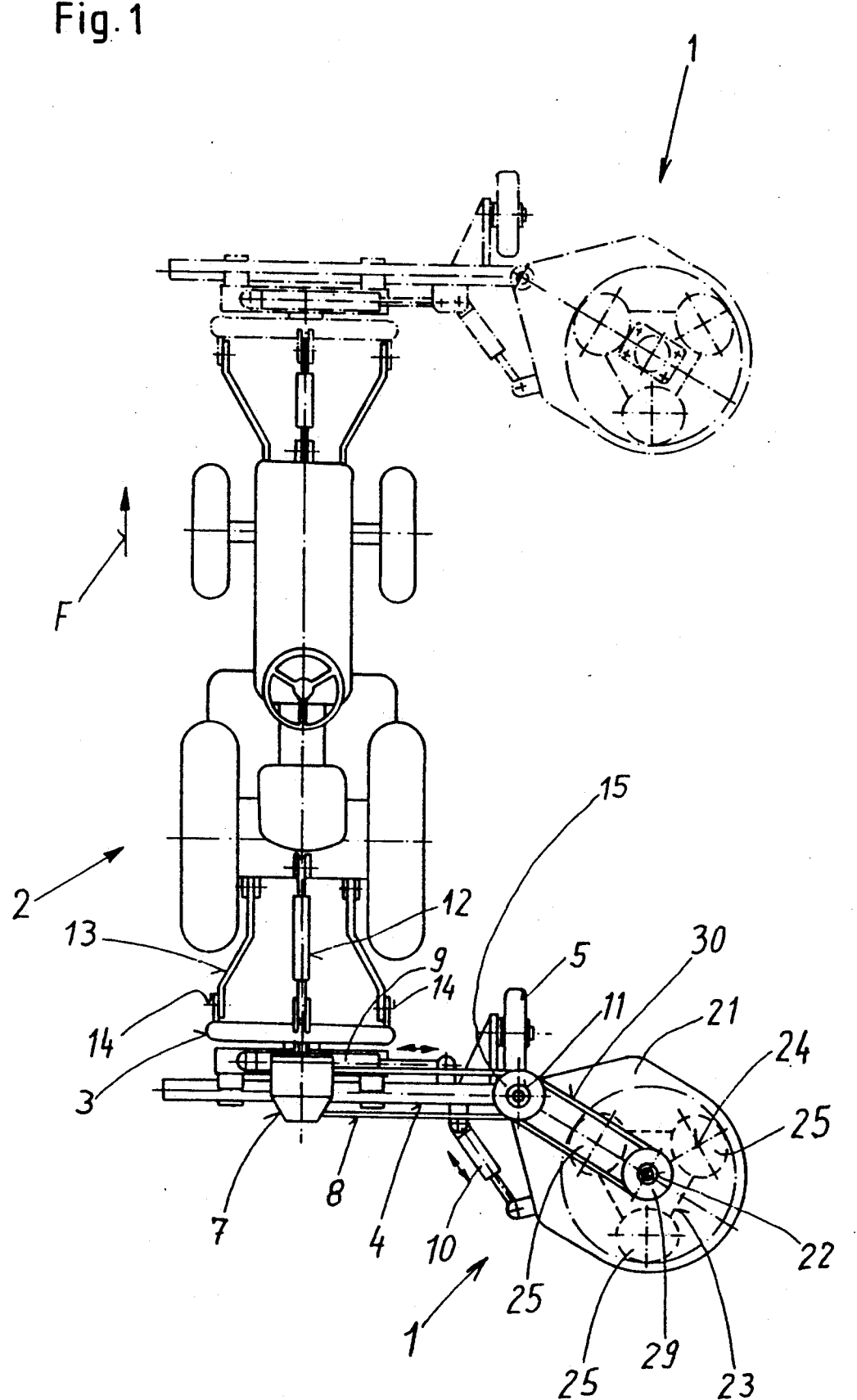

The soil tilling device 1 represented in FIG. 1 is connected to the rear end of a pulling vehicle 2 in the form of tractor, or as can be seen in the dash-dotted lines of the figure, at its front end and serves to till the soil B intensively and uniformly. A support frame 21 is supported at the tractor 2 by a holding means 4 which may be laterally displaced by a cylinder 9. The support frame 21 is provided with the tool holder 22 which carries the soil tilling tools 25. The tool holder 22 is driven by the gear box 7 and drive shaft 6 of the tractor 2 and is drivingly connected via a belt drive 8 which drives a pulley 15 that is positioned on a shaft 11. Via a further belt drive 30 the drive power is transmitted to a pulley 29 which is positioned at the tool holder 22 and is in a driving connection therewith. Assisted by a cylinder 10 the soil tilling device 1 which is connected to the vehicle frame 3 of the tractor 2 and which is supported by a wheel 5 may be pivoted sideways to a varying degree.

Figure 3:
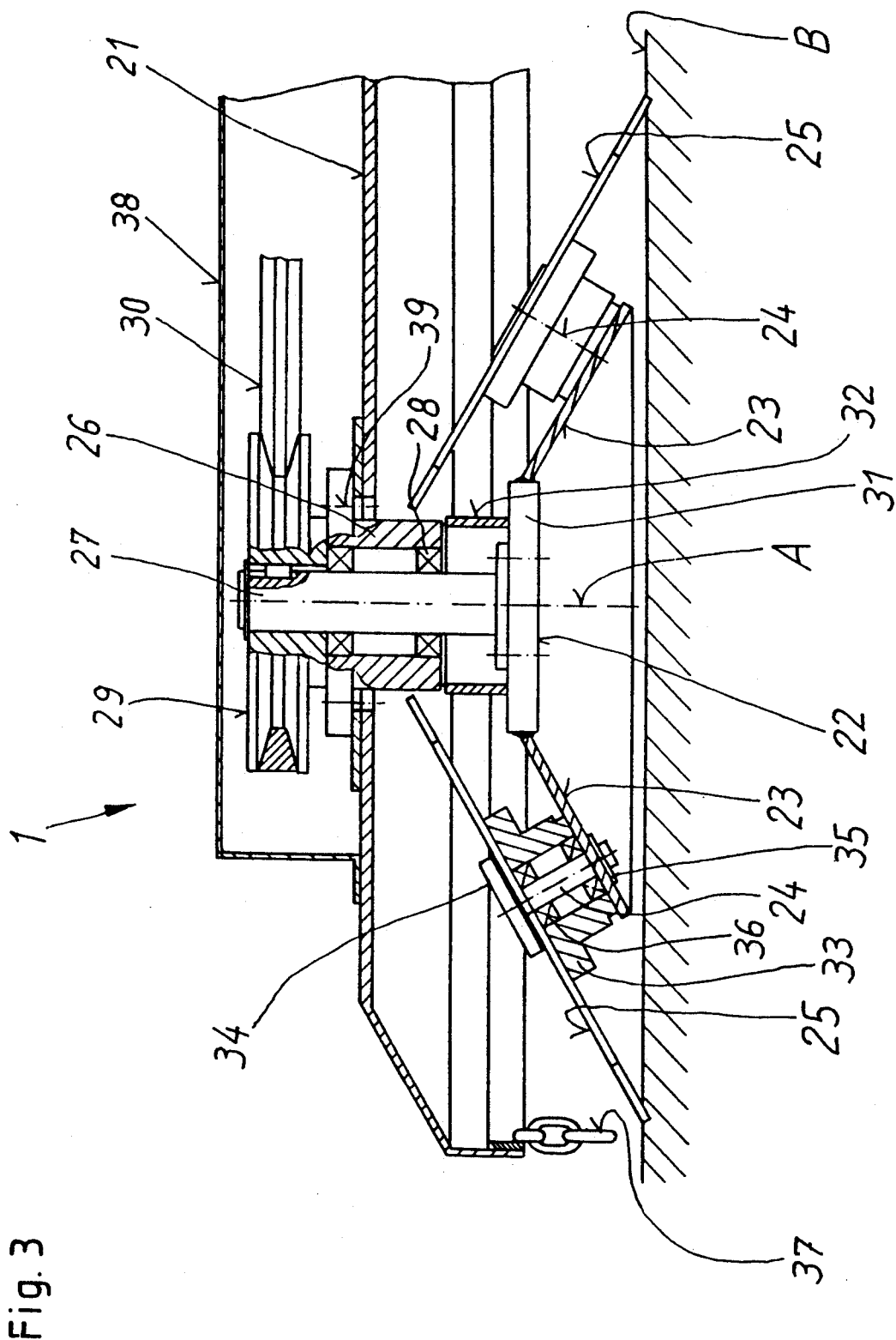
FIGS. 3-5 show an axial cross-sectional view of the tool holder of the soil tilling device according to FIG. 1 in various embodiments.
Figure 4:
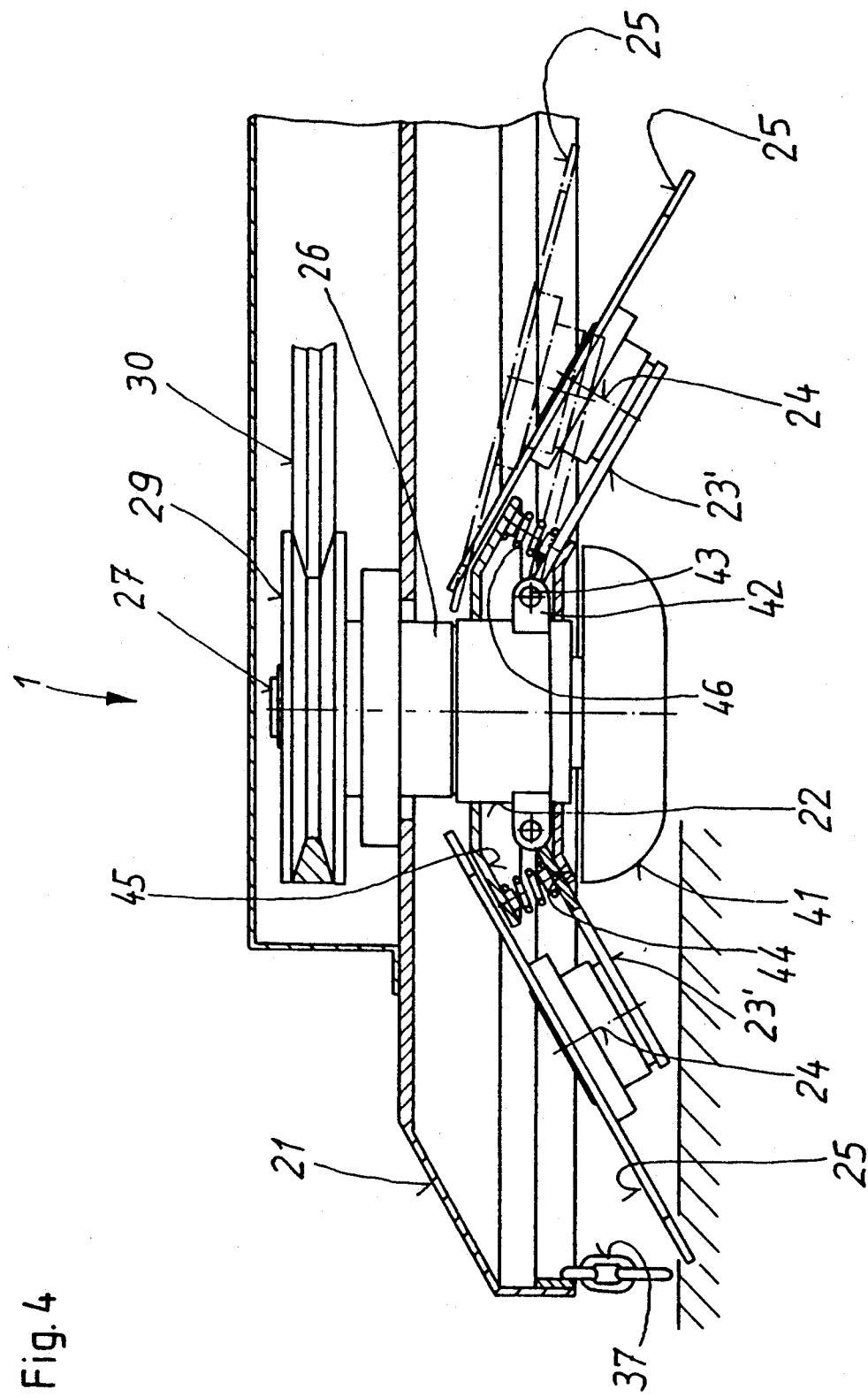
Figure 5:
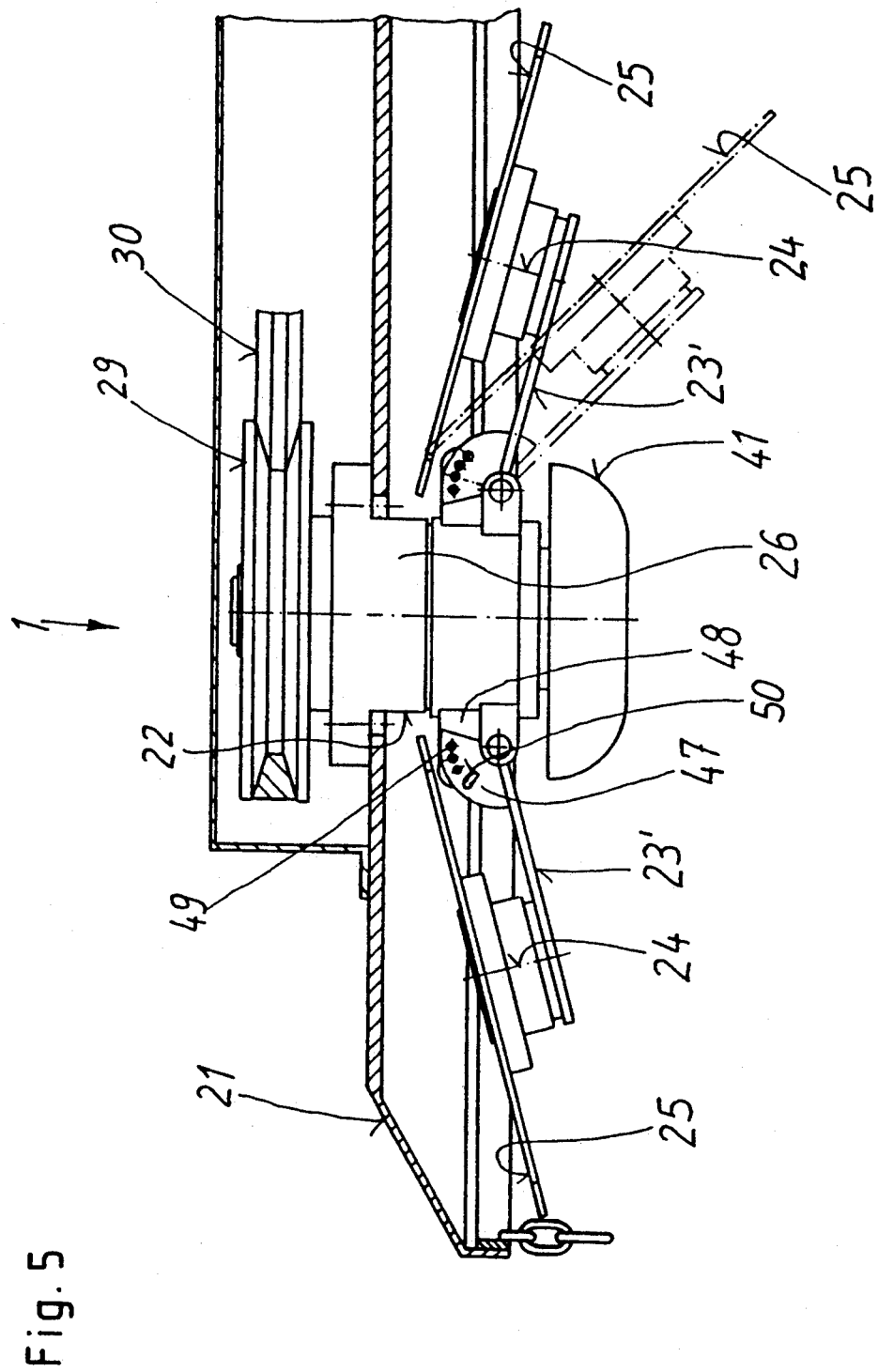

The soil tilling device 1, as can be seen in detail in the FIGS. 3 to 5, is comprised of two or more soil tilling tools 25 that are distributed over the circumference of the tool holder 22 at a uniform distance. The soiling tilling tools 25 are disk-shaped and are supported at a respective shaft 24 which is tilted relative to the axis of rotation A of the tool holder 22. A pyramid-shaped support 23 is provided for supporting the shafts 24 and is welded to the tool holder 22. The shafts 24 are provided with a respective collar 34 and are supported in a rotatable manner by a bearing 36 at a housing 33, whereby between the housing 33 and the collar 34 a respective soil tilling tool 25 is clamped. The shafts 24 which penetrate the support 23 are secured by snap rings 35.

The tool holder 22 is drivable about its axis of rotation A and is supported in a rotatable manner by a shaft 27, which carries the pulley 29, and ball bearings 28 at the housing 26. The housing 26 is fixedly connected by screw 39 to the support frame 21. Furthermore, the tool holder 22 is provided with a flange 31 to which the support 23 is welded, and a sleeve 32 as a protective measure which is supported at the flange 31. The outer areas of the support frame 21 are provided with chains 37 for covering the soil tilling tools 25. A cover 38 is provided at the support frame 21 for protecting the pulley 29 and the belt drive 30. In order to ensure soil engagement of the tilling tools 25 at a uniform depth of the soil B, an abutment in the form of a gliding disk 42 (see FIGS. 4 and 5) is provided at the tool holder 22. This abutment is height-adjustable and may optionally be in contact with the soil B.

With the embodiment according to FIG. 3, the support 23 is rigidly connected to the tool holder 22 so that the soil tilling tools 25 may not change their position. According to FIG. 4 the individual soil tilling tools 25 are each supported at a respective support 23' which is supported, pivotable about its axis, via a joint bolt 43 at a strap 42 provided at the tool holder 22. When the soil tilling tools 25 hit an obstacle the individual tool 25, as can be seen in the dash-dotted lines of FIG. 4, may optionally give way to the obstacle in an upward direction.

For returning the support 23' into its starting position pressure springs 46 are provided which are supported, on the one hand, at a crosspiece 45 provided at the tool holder 22 and, on the other hand, at the support 23', so that the support 23' is forced towards an abutment 42 provided at the tool holder 22 due to the force of the pressure spring 46 and thereby assumes a defined position.

The soil tilling tools 25 may also be arrested at different angles of tilt relative to the axis of rotation A of the tool holder 22. For this purpose plates 47 are provided at the supports 23' (see FIG. 5) and at the housing 26 of the tool holder 22 laterally extending plates 48 are provided. The plates 47, 48 have corresponding recesses 49. The arresting of the tool 25 in a desired position is simply achieved by inserting a pin 50 into two congruent recesses 49.

When the tool holder 22 of the soil tilling device 1 is driven by the tractor and is thus in rotation, the soil tilling tools 25 which due to the tilted arrangement of the shafts 24, have in their outer sections a respective tilling surface essentially cut the soil surface B without soil parts or rocks being thrown into the air. The soil tilling tools 25 which are rotatably supported at the shafts 24 are moved about the axis of rotation A of the tool holder 22, however, at the soil surface B they roll against the rotating movement of the tool holder so that roots of weeds to be removed are cut below the soil surface, but the loosened soil remains in place and is not removed. Furthermore the loosened soil may be additionally broken into smaller pieces and smoothed by the soil tilling tools 25 which are guided over the loosened soil. An intensive and uniform soil tilling at a uniform tilling depth is thus ensured.

Figure 2:
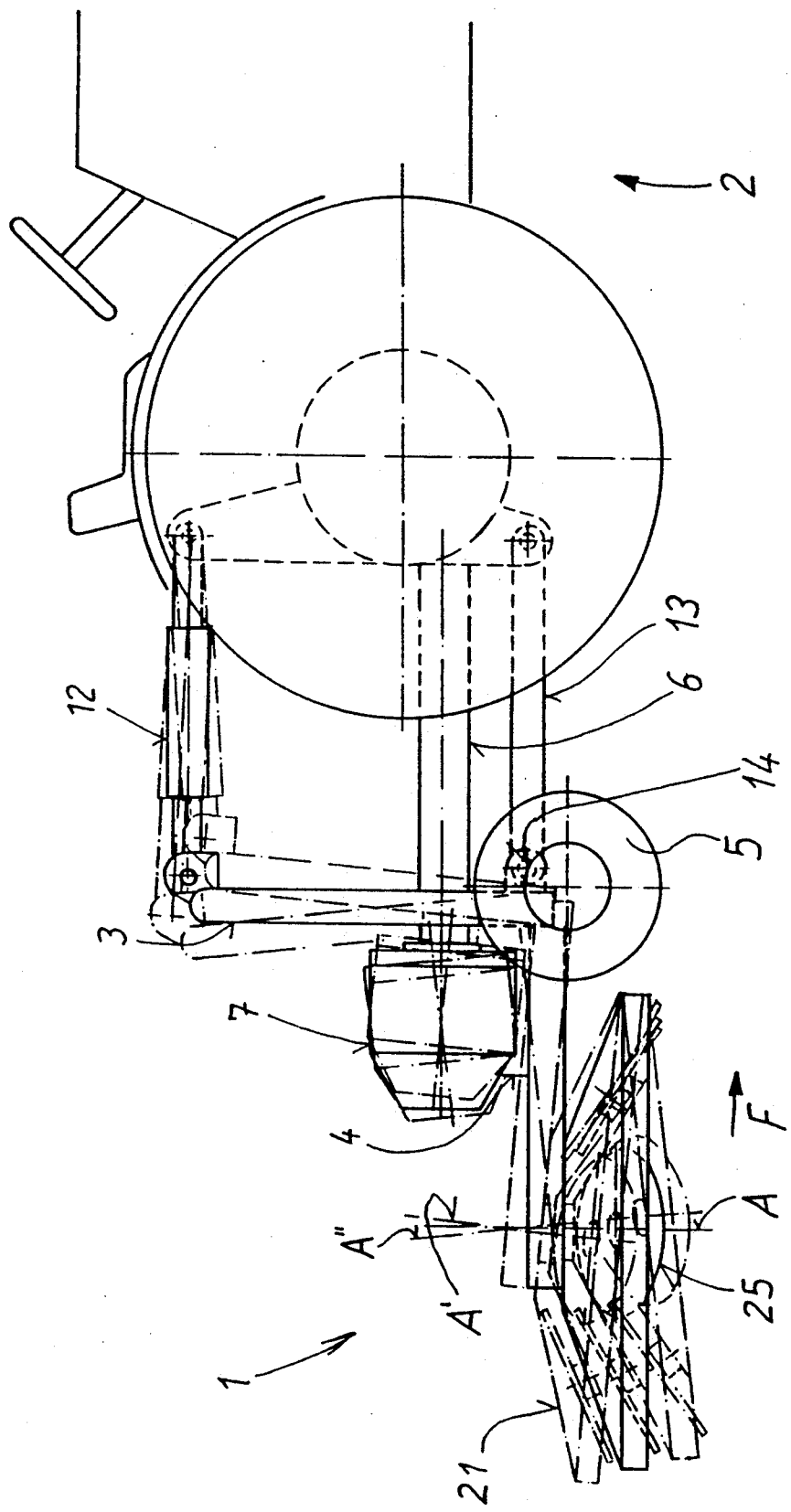
FIG. 2 shows the soil tilling device according to FIG. 1 in an enlarged side view.

Furthermore, the support frame 21 of the tractor 2 may be tilted in the travel direction F so that, as can be seen in the dash-dotted line in FIG. 2, the axis of rotation A of the tool holder 22 in the direction of travel F (axis A') or against the direction of travel F (axis A'') of the tractor 2. For this purpose the vehicle frame 3 is adjustable via two bolts 14 at the guide elements 13 of the tractor 2 and is pivotable about a horizontal axis and adjustable via a servo device 12.

Figure 7:
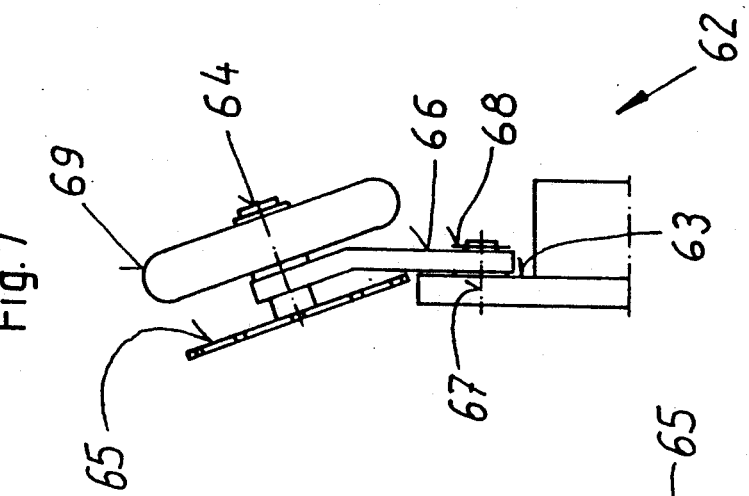
FIG. 7 shows a detail of the tool holder according to FIG. 6 in a side view.
Figure 6:
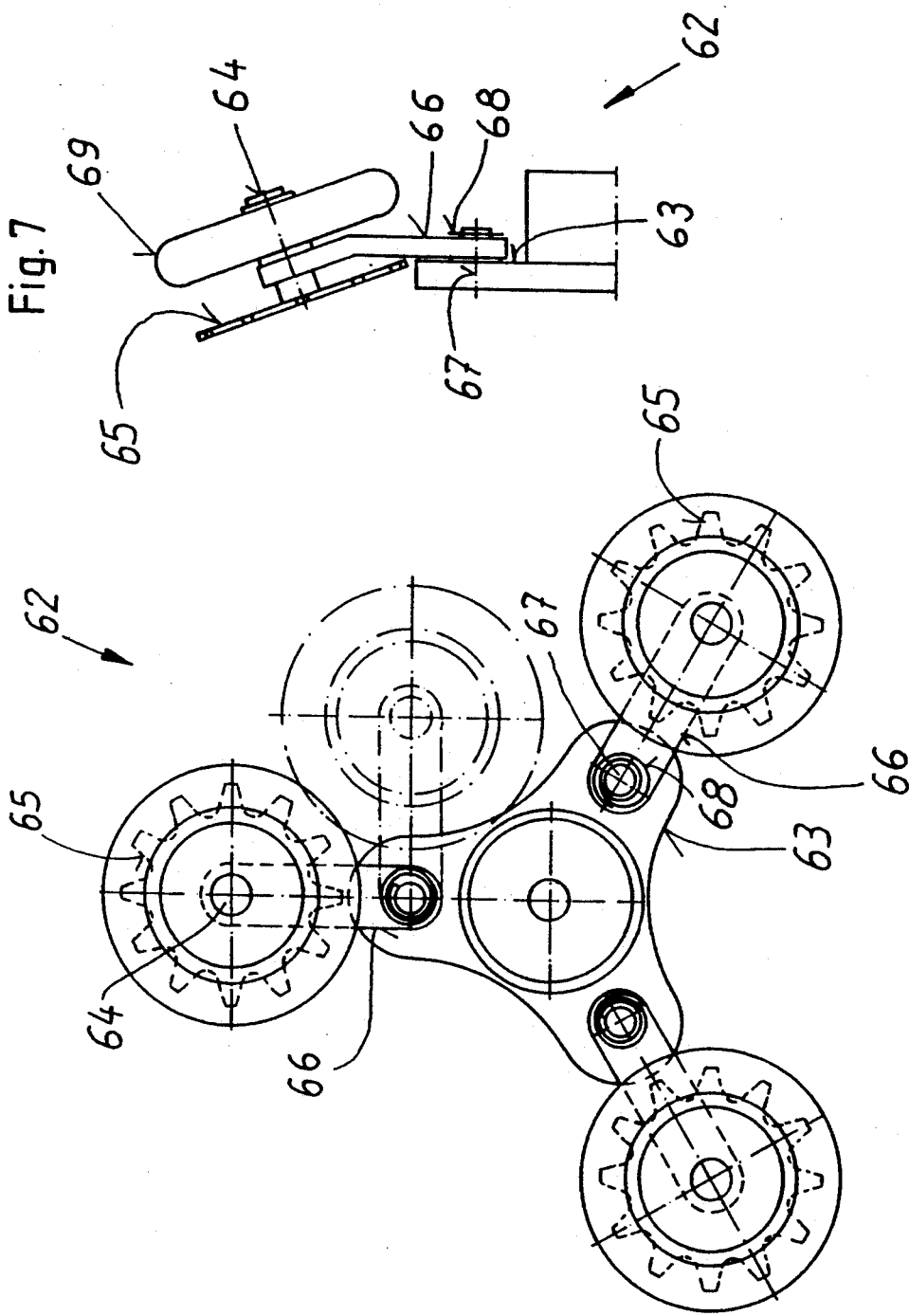
FIG. 6 shows a tool holder with pivotably connected soil tilling tools in a plan view.

The tool holder 62 according to the FIGS. 6 and 7 is provided with soil tilling tools 65 that are laterally pivotably supported at a support 63. For this purpose an angled carrier element 66 is provided which is pivotable against the force of a spring 68 about a shaft 67 provide at the support 63.

The shafts 64 which support the soil tilling tools 65 are tilted relative to the axis of rotation of the tool holder 62 so that the soil tilling tools 65 form tilling surfaces at their outer areas. Above the carrier elements 66 supporting means in the form of a rotatably supported wheel are provided so that when an obstacle appears within the tilling range of the tool holder 62 the soil tilling tools 65 may be pivoted inwardly due to the pivotable support at the carrier elements 66, as can be seen in the dash-dotted line of FIG. 6

The tool holder 82 represented in FIGS. 8 and 9 is provided with six soil tilling tools 85, 85' whereby diametrically oppositely arranged soil tilling tools are arranged in different levels so that they work in different rotation planes. Thus, three soil tilling tools 85 are in a common rotation plane and three soil tilling tools 85' are in a common rotation plane, with the arrangement of the tools 85 rotated by 60° relative to the arrangement of the tools 85' about the central shaft 87. The housings 86, 86' which receive the shafts 84 thus have a different height so that the distance between the support 83 and the soil tilling tools 85, 85' vary.

Figure 10:
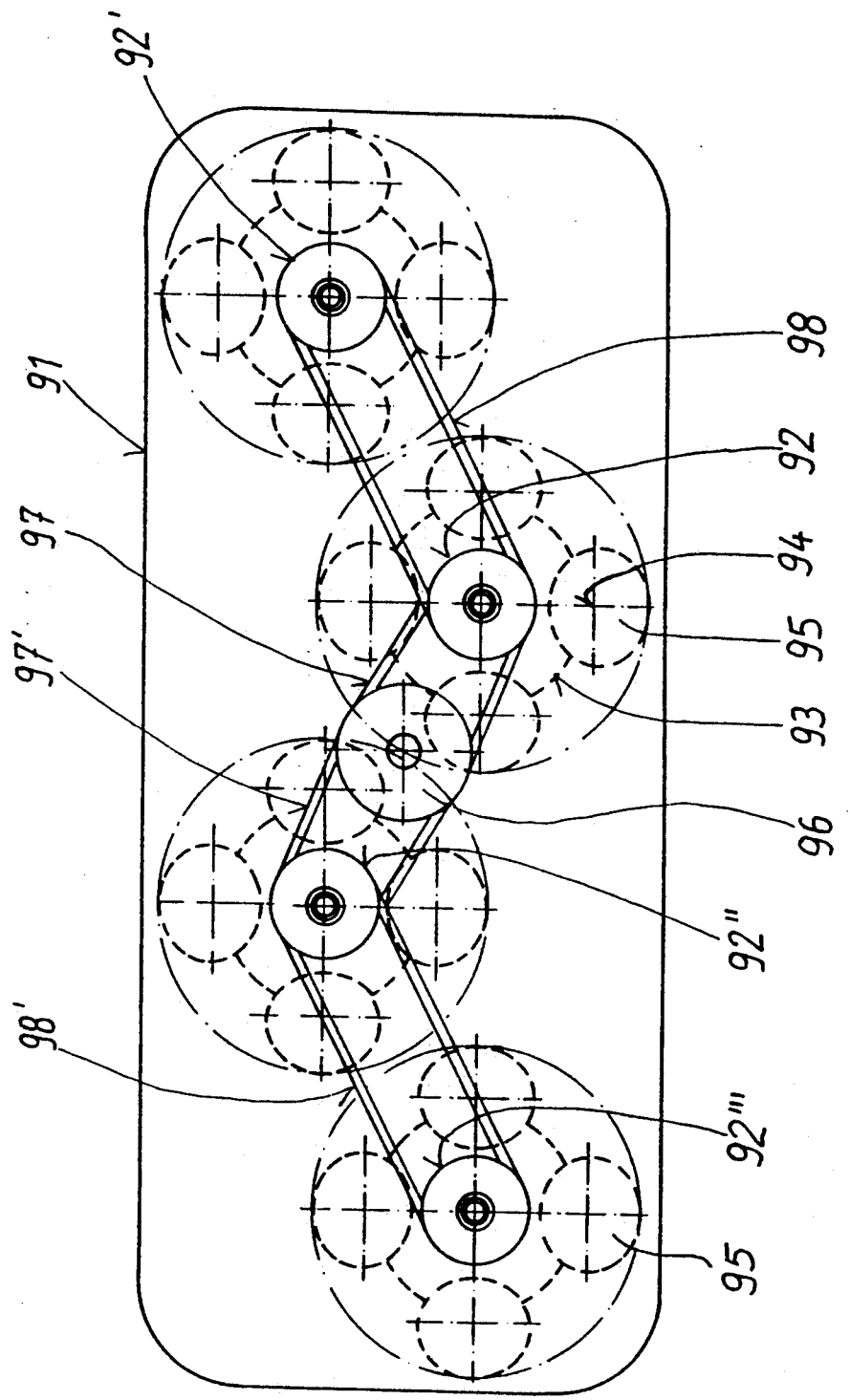
FIG. 10 shows a soil tilling machine having a plurality of laterally staggered tool holders in a plan view.

According to the embodiment represented in FIG. 10 the support frame 91 is provided with a plurality of tool holders 92, 92', 92'', and 92''' which are laterally staggered relative to one another such that their tilling ranges overlap. The soil tilling tools 95 which are connected to a support 93 and are rotatable about a shaft 94 that is tilted relative to the axis of rotation of the tool holders 92, 92', 92'', and 92''' are commonly drivable. For this purpose a drive pulley 96 is provided which is drivingly connected to the tractor 2 and is connected via belt drives 97 and 97' with the tool holders 92 and 92''. The tool holders 92 and 92'' are in return connected via belt drives 98 and 98' with the tool holders 92' and 92'''.

Figure 11:
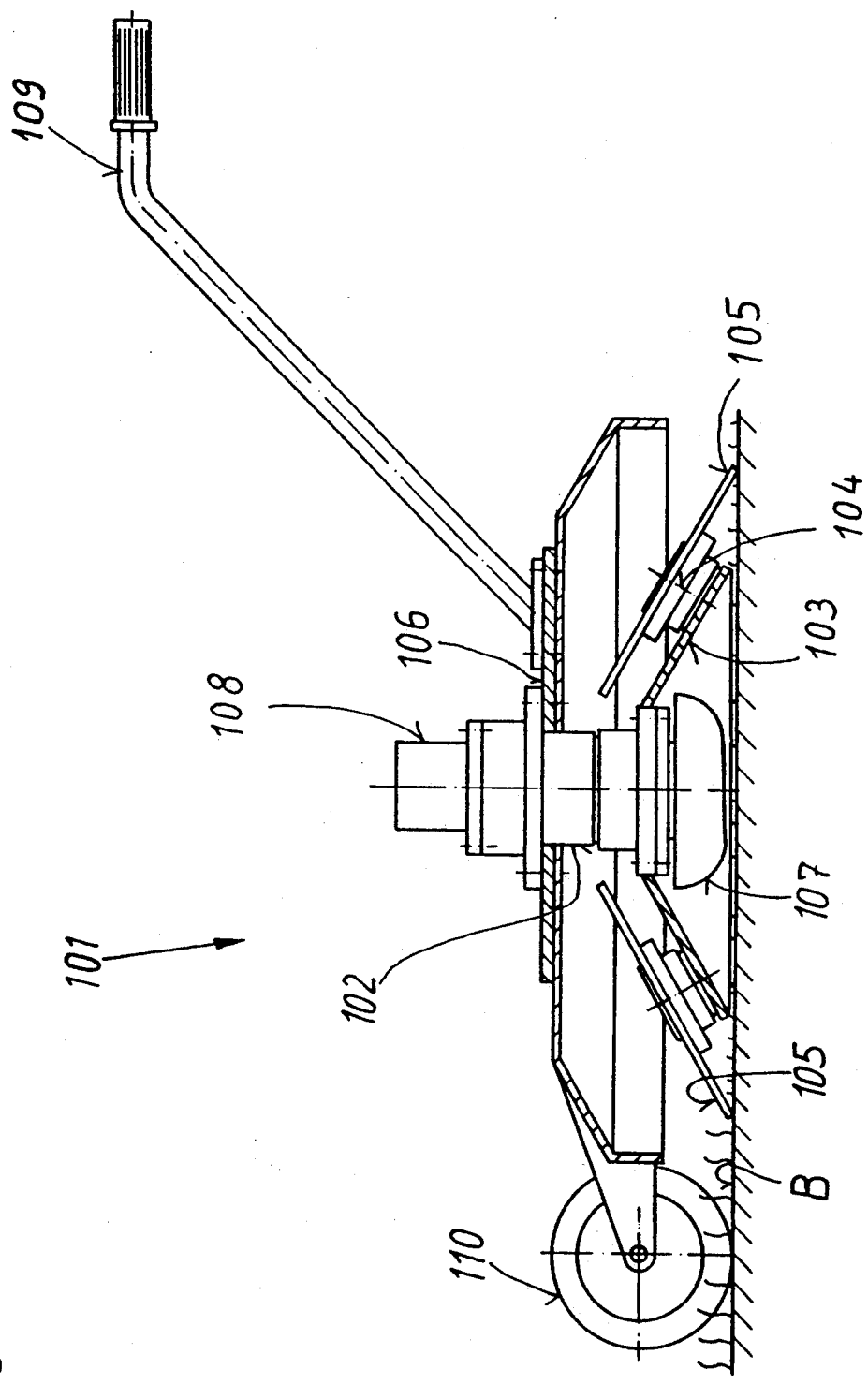
FIG. 11 shows a soil tilling device that is usable as a lawn mower in a longitudinal cross-sectional view.
Figure 13:
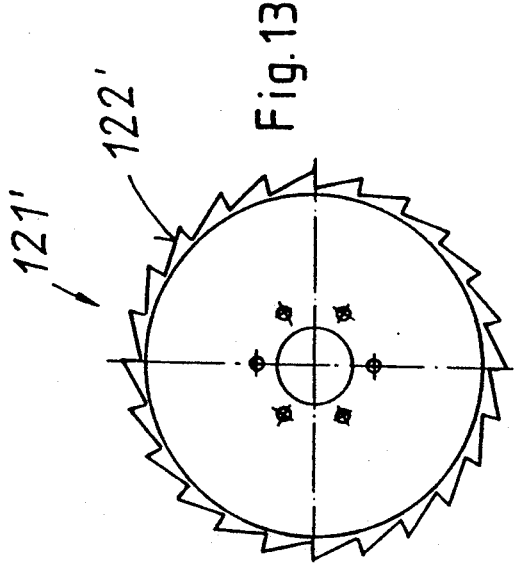
FIGS. 12-16 represents various embodiments of the soil tilling tools in a plan view.
Figure 14:
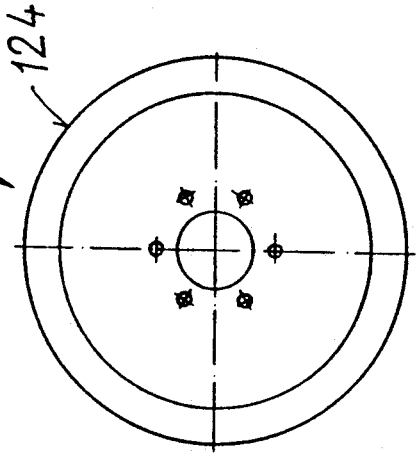
Figure 12:
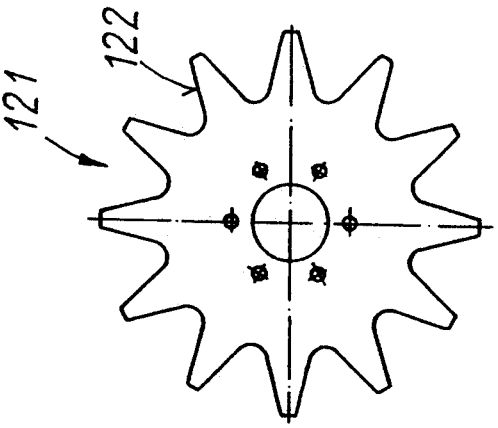
Figure 16:
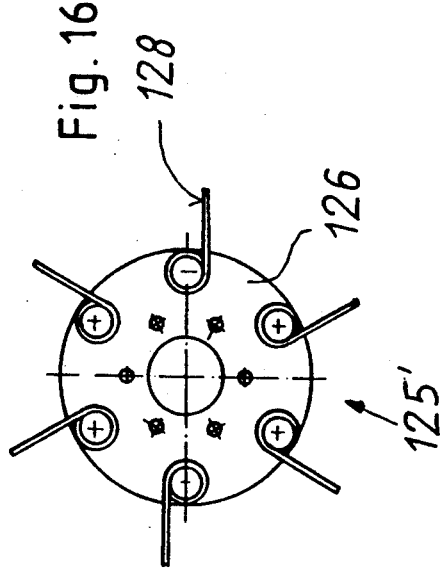
Figure 15:
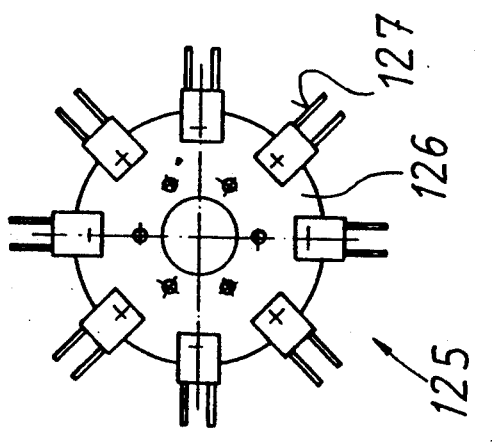

The soil tilling machine 101 which is represented in FIG. 11 may be used as a lawnmower and is essentially comprised of a tool holder 102 to which a pyramid-shaped support 103 is connected which is provided with a plurality of soil tilling tools 105 that are supported on respective shafts 104. The shafts 104, in this embodiment, are tilted relative to the axis of rotation of the tool holder 102 so that the outer sections of the tools form respective tilling surfaces.

The tool holder 102 which is positioned in a housing 106 is driven by a motor 108 that is connected to the housing 106. Furthermore, the housing 106 is provided with a handle 109 and a wheel 110. The tool holder 102 has an abutment in the form of gliding disk 107. The soil tilling device 101 may thus be moved over the soil surface B manually in order to cut grass with the soil tilling tools 105 that are rotatably driven by the tool holder 102, or, when set to a respective tilling depth, may loosen the soil.

FIGS. 12 to 15 show embodiments of the soil tilling tools that may be used with the soil tilling devices according to FIGS. 1 through 11. According to FIGS. 12 and 13 the soil tilling tools 121 respectively 121' are embodied as toothed disks 122 respectively 122', and according to FIG. 14 the soil tilling tool 123 is provided in the form of a disk-shaped knife 124. According to the representations of FIGS. 15 and 16 it is also possible to provide the soil tilling tool 125 respectively 125' in the form of disks 126 to which outwardly extending brushes 127, respectively, spring prongs 128 are fastened.

FIGS. 17 and 18 represent a mower 201 which may be used especially for trimming edges. Here a support frame 202 is provided and has connected thereto a pivoting arm 203 which is provided with a tool holder 204 that has connected thereto disk-shaped soil tilling tools 205. The tool holder 204 is rotatably supported at a shaft 208 and is drivable about an axis A in the direction of the arrow P by a motor 206 and a corresponding belt drive 207.

The pivoting arm 203 is further provided with a sensor 210 that is arranged outwardly of the tool holder 204 and is connected to a control device 211. When the sensor 210 contacts an obstacle H, for example, a tree trunk, it is pivoted towards the center so that the control device 211 activates a servo device 209 via which the pivoting arm 203 and therewith the soil tilling tools 205 of the tool holder 204 are also pivoted inwardly so that damages to the tools 205 resulting from the obstacle may be avoided.

In order to be able to cut the grass between the obstacles H and grass that is located immediately adjacent to those obstacles, a cleaning tool in the form of a wheel brush 221 is provided vertically above the soil tilling tools 205 with which the grass may be fed into the soil tilling tools 205. The brushes 223 of the wheel brush 221 are in the form of elastically deformable rods or straps made from weather-resistance plastic material which are, as can be seen in FIG. 18, connected to a disk 222.

Since the wheel brush 221 is fixedly connected to the tool holder 204 and accordingly rotates together with the tool holder 204 in the direction of the arrow P the grass which is gripped by the brushes 223 is guided in the direction of the disk-shaped soil tilling tools 205 and accordingly may be cut by the tools 205. With a soil tilling device 201 according to the above described embodiment, within one working step the soil tilling within the area designated by the letter C may be activated, and, simultaneously, the cleaning of the area between the obstacles H, designated by the line D, may be cleaned.

Figure 20:
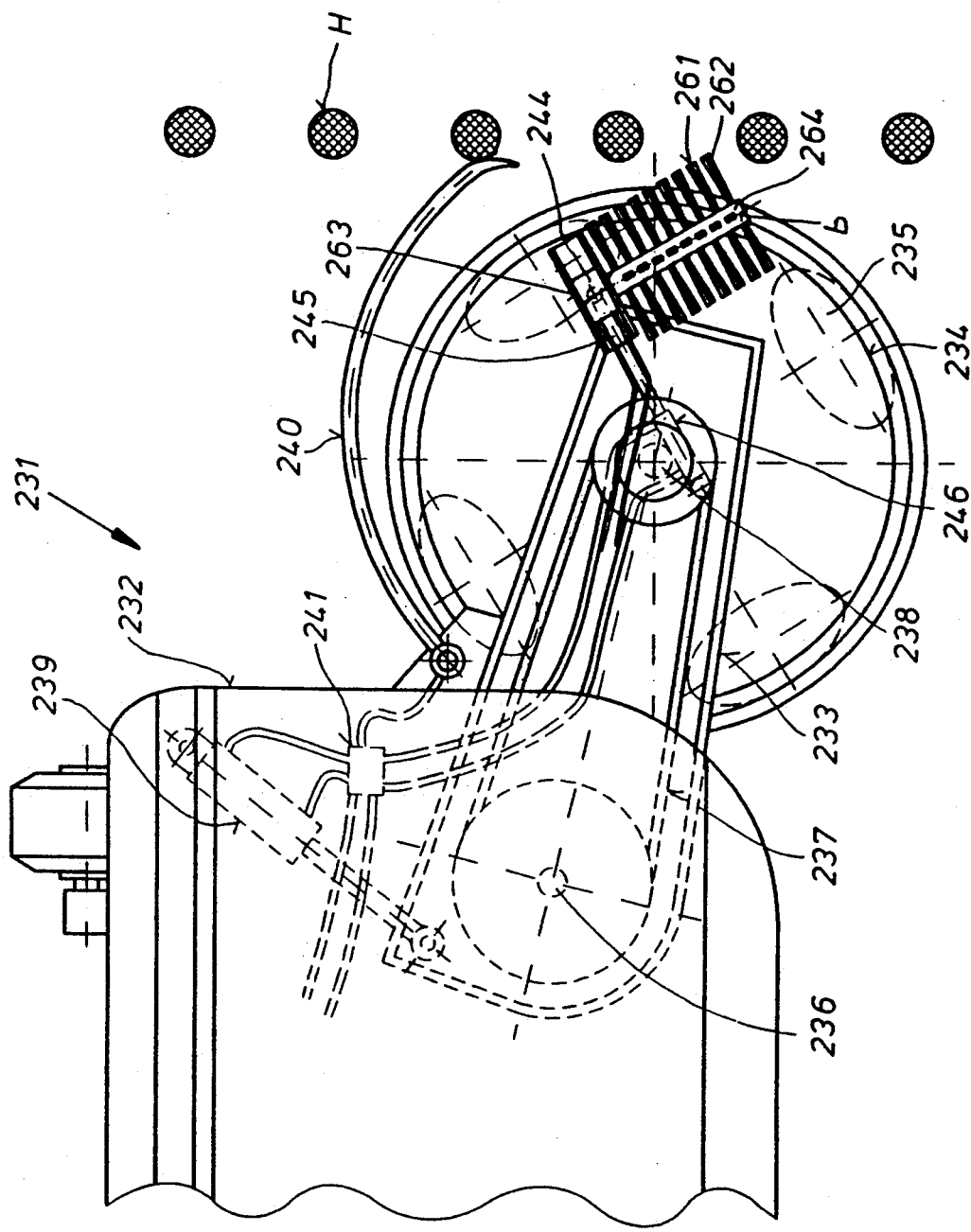

The soil tilling device according to FIGS. 19 and 20 represents a mulching device 231 which guides the grass that is positioned between the obstacles H to the soil tilling tools 235 connected to the tool holder 234. For this purpose a wheel brush 251 or a brush roller 261 are provided. The tool holder 234 is connected to a pivoting arm 233 which is fastened in a pivotable manner at the housing 232 of the mulching device 231 and is driven by a belt drive 237. The drive power is transmitted by a rotatably driven shaft 236 to the shaft 238 which is fixedly connected to the tool holder 234 so that the tool holder 234 is drivable in the direction of the arrow P. With the aid of a servo device 239 the pivotable arm 233 is adjustable.

The wheel brush 252 is rotatably supported at a lever 242 which is pivotably arranged at the shaft 238. The pivoting action of the lever 242 is achieved by a servo device 243 which is actuated by a control device 241. The control device 241 is furthermore connected to a sensor 240.

When the sensor 240 is pivoted inwardly due to contact with an obstacle H then the servo device 243 is actuated by the control device 241 so that the lever 242 together with the wheel brush 252 is pivoted into the position indicated as a dash-dotted line in the drawing. The brushes 252 extend beyond the working area C of the tool holder 234 so that with the aid of the belt drive 253 the rotatably driven wheel brush 251 catches the grass that is positioned between the obstacles H and feeds it into the soil tilling tools 235 so that the grass may be cut.

According to FIG. 20 the cleaning tool is in the form of a brush roller 261 which is drivable about a horizontally extending axis b by a motor 263 which is actuatable by a pressure medium, i.e., a well-known rotary motor such as a multi-cell motor or vane-type motor operated by a pressure medium such as hydraulic oil or compressed air is provided. The brush roller 261 is outwardly movable by a servo device 246 in the form of a piston/cylinder arrangement operated by a hydraulic medium. The motor 263 which is connected to the shaft 264, on which the brush elements 262 are fastened, is in the form of a slide 244, whereby at the pivoting arm 233 a guide 245 is provided for receiving the motor 263. The servo device 246 thus can move the slide-shaped motor 263 along the guide 245 into a desired position. A sensor 240 is connected to a control device 241 which upon pivoting of the sensor 240 moves the brush roller 261 with the aid of the servo device 246 into the represented operational position. The brush elements 264 are, in a manner known per se, int he form of flaps made of strips of rubber, leather, or similar materials. The flaps, due to the centrifugal forces generated by rotation, are "stiffened" and provide for a gentle working of the soil.

The present invention is, of course, in no way restricted to the specific disclosure of the specification and drawings, but also encompasses any modifications within the scope of the appended claims.

What I claim is:

1. A soil tilling device that is pulled by a tractor vehicle, said soil tilling device comprising:
   at least one tool holder that is supported at a supporting element and is rotatably drivable about a substantially vertical axis;
   at least two circular disk-shaped soil tilling tools connected to a respective one of said tool holders and uniformly distributed over a circumference of said tool holder;
   each one of said soil tilling tools having a shaft;
   said tool holder comprising a support, said soil tilling tools rotatably connected by said shaft to said support, with an axis of rotation of said soil tilling tools corresponding to said shaft; and
   said shaft being slanted relative to an axis of rotation of said tool holder such that said soil tilling tools have an angle of 20° to 40° to a surface of soil to be tilled, with circumferential sections of said soil tilling tools forming tilling surfaces, wherein said soil tilling tools are connected to a common one of said supports, and said support is in the shape of a truncated pyramid.

2. A soil tilling device according to claim 1, wherein said supporting element is a support frame.

3. A soil tilling device according to claim 2, wherein said support frame is pivotable about a pivoting axis which is essentially horizontal and extends perpendicularly to a direction of travel of said soil tilling device, said pivoting axis being in the form of a bolt that is provided at guiding elements of a frame of the tractor vehicle, said guiding elements being connected to said support frame.

4. A soil tilling device according to claim 3, wherein, for pivoting said support frame, a servo device is provided at said guiding elements.

5. A soil tilling device according to claim 1, wherein said axis of rotation of said tool holder is tilted against a direction of travel of said soil tilling device.

6. A soil tilling device according to claim 1, wherein said axis of rotation of said tool holder is tilted against a direction of travel of said soil tilling device.

7. A soil tilling device according to claim 1, wherein each one of said soil tilling tools is provided with a respective one of said supports, said supports being connected to said tool holders as to be adjustable about a horizontally pivotable axis in the form of a bolt.

8. A soil tilling device according to claim 7, wherein a respective working end position of said supports is determined by a respective abutment.

9. A soil tilling device according to claim 7, wherein said supports are adjustable at different angles of tilt relative to one another.

10. A soil tilling device according to claim 1, wherein said supporting element is a swivel arm.

11. A soil tilling device that is pulled by a tractor vehicle, said soil tilling device comprising:
- at least one tool holder that is supported at a supporting element and is rotatably drivable about a substantially vertical axis;
- at least two circular disk-shaped soil tilling tools connected to a respective one of said tool holders and uniformly distributed over a circumference of said tool holder;
- each one of said soil tilling tools having a shaft;
- said tool holder comprising a support, said soil tilling tools rotatably connected by said shaft to said support, with an axis of rotation of said soil tilling tools corresponding to said shaft; and
- said shaft being slanted relative to an axis of rotation of said tool holder such that said soil tilling tools have an angle of 20° to 40° to a surface of soil to be tilled, with circumferential sections of said soil tilling tools forming tilling surfaces, wherein each one of said soil tilling tools is provided with a respective one of said supports, said supports being connected to said tool holders so as to be adjustable about a horizontally pivotable axis in the form of a bolt, and wherein said support is adjustable against the force of a spring.

12. A soil tilling device that is pulled by a tractor vehicle, said soil tilling device comprising:
- at least one tool holder that is supported at a supporting element and is rotatably drivable about a substantially vertical axis;
- at least two circular disk-shaped soil tilling tools connected to a respective one of said tool holders and uniformly distributed over a circumference of said tool holder;
- each one of said soil tilling tools having a shaft;
- said tool holder comprising a support, said soil tilling tools rotatably connected by said shaft to said support, with an axis of rotation of said soil tilling tools corresponding to said shaft; and
- said shaft being slanted relative to an axis of rotation of said tool holder such that said soil tilling tools have an angle of 20° to 40° to a surface of soil to be tilled, with circumferential sections of said soil tilling tools forming tilling surfaces, wherein said soil tilling tools are connected to a common one of said supports, and said support is in the shape of a truncated cone.

* * * * *